(12) United States Patent
Stempinski

(10) Patent No.: US 8,246,226 B2
(45) Date of Patent: *Aug. 21, 2012

(54) BACK-LIT VEHICLE EMBLEM

(75) Inventor: Stephan M. Stempinski, Delray Beach, FL (US)

(73) Assignee: Stephan M. Stempinski, Delray Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/026,971

(22) Filed: Feb. 14, 2011

(65) Prior Publication Data

US 2011/0131848 A1    Jun. 9, 2011

Related U.S. Application Data

(63) Continuation of application No. 12/549,480, filed on Aug. 28, 2009.

(51) Int. Cl.
*F21V 33/00* (2006.01)
(52) U.S. Cl. ........................ 362/496; 362/545
(58) Field of Classification Search ............... 362/496, 362/545
See application file for complete search history.

(56) References Cited

U.S. PATENT DOCUMENTS

| 1,402,479 | A | 1/1922 | Causon |
| 1,629,231 | A | 5/1927 | Stover |
| 4,977,695 | A | 12/1990 | Armbruster |
| 5,211,466 | A | 5/1993 | Jarocki |
| 6,190,026 | B1 | 2/2001 | Moore |
| 7,175,324 | B2 | 2/2007 | Kwon |
| 7,387,397 | B2 | 6/2008 | Konet |
| 7,931,393 | B2 * | 4/2011 | Stempinski ................. 362/496 |
| 2003/0037472 | A1 | 2/2003 | Nolan |
| 2006/0023468 | A1 * | 2/2006 | Takahashi et al. ............ 362/555 |

FOREIGN PATENT DOCUMENTS

| CN | 2815776 Y | 9/2006 |
| CN | 2815777 Y | 9/2006 |
| CN | 2905560 Y | 5/2007 |
| DE | 202004004917 U1 | 6/2004 |
| FR | 2723710 A3 | 2/1996 |
| FR | 2848943 A1 | 6/2004 |
| FR | 2884199 A1 | 10/2006 |
| JP | 5213124 A | 8/1993 |
| JP | 8002342 A | 1/1996 |
| JP | 2004051046 A | 2/2004 |

* cited by examiner

*Primary Examiner* — Laura Tso
(74) *Attorney, Agent, or Firm* — Christopher & Weisberg, P.A.

(57) ABSTRACT

A back-lit vehicle emblem is disclosed, that provides an emblem body having a front side facing away from the vehicle and exhibiting the emblem and having a rear side facing toward the vehicle. The body is shaped to provide at least a partial housing for mounting at least one LED. A space between the body and the vehicle when the body is mounted upon the vehicle is provided. At least one LED is mounted in the at least partial housing and oriented to transmit light through the space between the body and the vehicle so that light illuminates one or more contours of the body.

13 Claims, 2 Drawing Sheets

BACK-LIT VEHICLE EMBLEM

CROSS-REFERENCE TO RELATED APPLICATION

This application is a Continuation of U.S. patent application Ser. No. 12/549,480, filed Aug. 28, 2009, entitled BACK-LIT VEHICLE EMBLEM, the entirety of which is incorporated herein by reference.

STATEMENT REGARDING FEDERALLY SPONSORED RESEARCH OR DEVELOPMENT n/a

FIELD OF THE INVENTION

The present invention relates to a method and system for illuminating emblems, and in particular, to illuminating emblems on a vehicle.

BACKGROUND OF THE INVENTION

Emblems are commonly placed on vehicles to indicate the make and model of the vehicle or to exhibit another message or logo. Thus, an emblem may be a logo with or without lettering which depicts a sports team, a religious symbol or other message. Emblems are normally placed on the front portion of a car hood, the front grill or on a side panel or rear panel of the vehicle. A problem with current emblems is that they cannot be seen in the dark, or they are illuminated in a way that may be expensive, difficult to assemble, or not aesthetically pleasing. Further, current emblems are sometimes substantially modified from their manufactured appearance.

SUMMARY OF THE INVENTION

The present invention advantageously provides a method and system for illuminating an emblem on a vehicle. According to one aspect, the invention provides an emblem body having a front side facing away from the vehicle and exhibiting the emblem and having a rear side facing toward the vehicle. The body is shaped to provide at least a partial housing for mounting at least one LED. A space between the body and the vehicle when the body is mounted upon the vehicle is provided. At least one LED is mounted in the at least partial housing and oriented to transmit light through the space between the body and the vehicle so that light illuminates one or more contours of the body.

According to another aspect, the invention provides a body shaped to exhibit a symbol and to form a housing for an LED that is mounted to transmit light toward the surface through a space between the body and the vehicle to illuminate one or more contours of the symbol.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
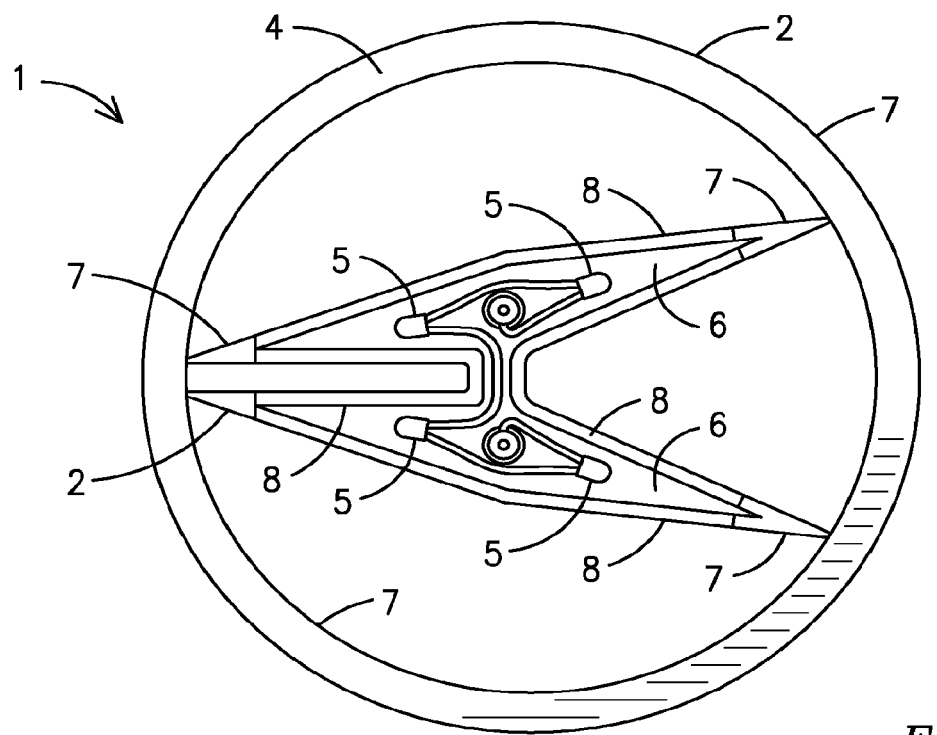
FIG. 1 is a rear view of a back-lit vehicle emblem constructed in accordance with the principles of the present invention.

Before describing in detail exemplary embodiments that are in accordance with the present invention, it is noted that the embodiments reside primarily in combinations of apparatus components and processing steps related to implementing a back-lit vehicle emblem. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 2:
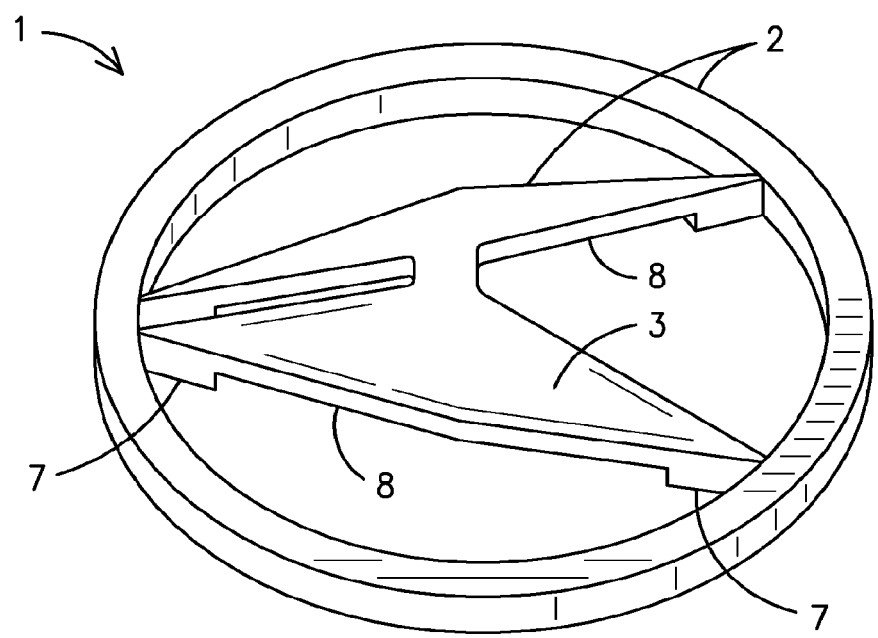
FIG. 2 is a perspective view of a back-lit vehicle emblem.

Referring now to the drawing figures in which like reference designators refer to like elements, there is shown in FIG. 1 a rear view of a back-lit vehicle emblem 1 constructed in accordance with the principles of the present invention, as disclosed herein. The emblem has a body 2 with a front surface 3 as shown in FIG. 2. The body 2 may be in the shape of a logo and/or may include lettering depicting a make or model of the vehicle, or may exhibit some other design such as a sports team's logo, a religious symbol, etc. At least one light emitting diode 5 is located in a hollow portion 6 of the body 2. The rear surface 4 has at least one edge 7. A portion of the at least one edge 7 is a raised edge 8 so that when the at least one LED 5 is activated, light emitted from the LED 5 will shine through a space between the body and the vehicle under the raised edge 8, thereby illuminating the emblem.

FIG. 2 is a perspective view of the back-lit emblem of FIG. 1. The emblem 1 has a body 2 with a front surface 3 and a rear surface 4 shown in FIG. 1. The rear surface 4 has at least one edge 7 which includes a raised edge portion 8. When the at least one LED 5 is activated, light propagates through the space between the emblem and the vehicle and illuminates the raised edge portion 8. Also, the light may reflect from a surface of the vehicle and illuminate the raised edge portion 8 and thereby illuminate the emblem contours.

Figure 3:
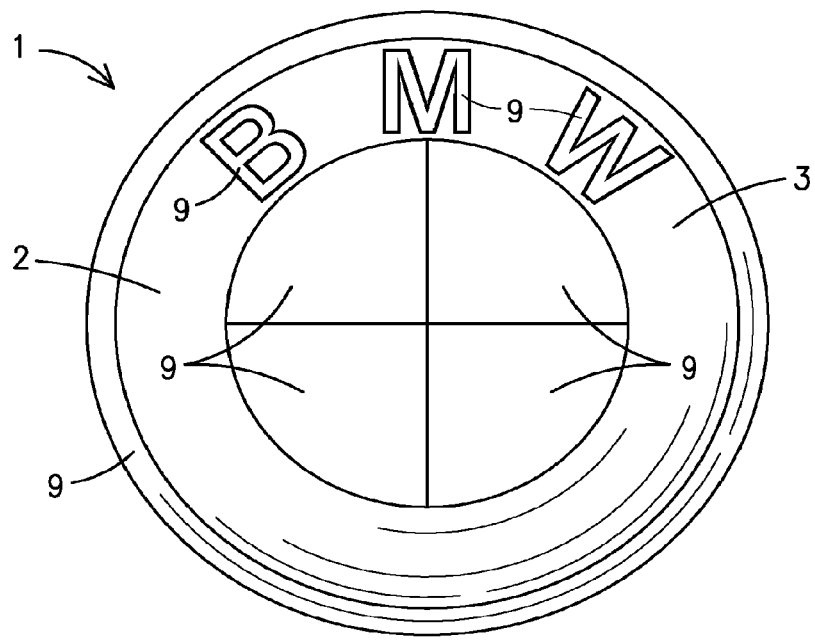
FIG. 3 is a front view of a back-lit vehicle emblem.
Figure 4:
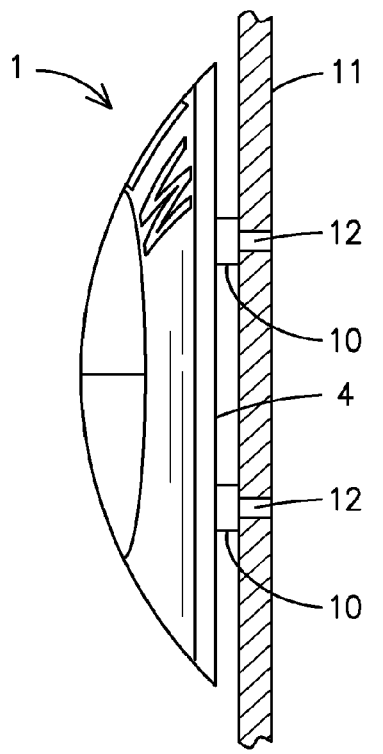
FIG. 4 is a side partial cutaway view of a back-lit vehicle emblem having at least one spacer.

FIG. 3 is a front view and FIG. 4 is a side view of another back-lit emblem. The emblem 1 has a body 2 with a front surface 3. The body 2 may be in the shape of a logo and/or lettering. Some portions may be translucent features 9 that emit light from the LED 5 embedded in a hollow portion 6 of the body 2. Light travels from the LED 5 through the space between the body and the vehicle to illuminate outer edges of the emblem 1. The emblem 1 may have at least one spacer 10 mounted on the vehicle 11 using a mounting mechanism 12, such as adhesive, double-sided tape, screws, nuts, bolts, etc. The spacer 10 creates a space between a rear surface 4 of the emblem 1 and the vehicle 11, thereby allowing light to travel through the space between the emblem 1 and the vehicle 11 to reflect from the vehicle 11 and illuminate along raised edges 8 that are spaced away from the vehicle 11 by the spacer 10.

Figure 5:
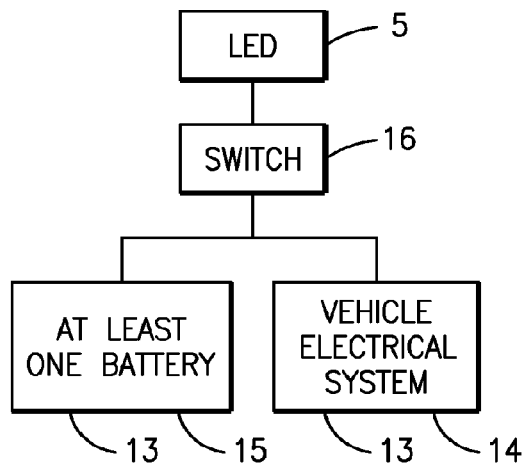
FIG. 5 is a block diagram showing components associated with a back-lit vehicle emblem.

FIG. 5 is a block diagram of components for illuminating an emblem as described herein. An LED 5 is connected through a switch 16 to at least one power source 13. The power source 13 may be a vehicle battery 15 or the vehicle electrical system 14. The LED 5 may be activated by the switch 16. In one embodiment, when certain lights of the vehicle, such as the headlights or brake lights, are turned on, the LED 5 is also turned on.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An illuminated vehicle emblem, comprising:
a body having a front side facing away from the vehicle and exhibiting the emblem and having a rear side facing toward the vehicle and shaped to provide at least a partial housing for mounting at least one LED, there being a space between the body and the vehicle when the body is mounted upon the vehicle; and
at least one LED mounted in the at least partial housing and oriented to transmit light through the space between the body and the vehicle so that light illuminates one or more contours of the body.

2. The vehicle emblem of claim 1, wherein the light illuminates one or more contours of the body by reflecting off a surface of the vehicle.

3. The vehicle emblem of claim 1, wherein the light illuminates one or more contours of the body by passing outward along one or more edges, the edges spaced away from the vehicle.

4. The vehicle emblem of claim 1, wherein the emblem is a logo.

5. The vehicle emblem of claim 1, wherein the emblem shows a make of the vehicle.

6. The vehicle emblem of claim 1, wherein the emblem shows a model of the vehicle.

7. An illuminated symbol mountable at a surface of a vehicle, comprising:
a body shaped to exhibit the symbol and to form a housing for an LED that is mounted to transmit light toward the surface through a space between the body and the vehicle to illuminate one or more contours of the symbol.

8. The illuminated symbol of claim 7, wherein the body prevents direct light from the LED from shining directly forward, without reflection, in a direction away from the vehicle.

9. The illuminated symbol of claim 7, wherein the light illuminates the one or more contours of the symbol by illuminating at least one edge that is spaced a distance apart from the vehicle so that light along the edge appears to an observer facing the vehicle.

10. The illuminated symbol of claim 9, wherein the light is provided by at least one and not more than four LEDs contained within the housing.

11. The illuminated symbol of claim 7, wherein the symbol exhibits edges that are raised to be spaced apart from the vehicle when the body is mounted to the vehicle.

12. The illuminated symbol of claim 7, wherein the LED is powered by a battery separate from a battery of the vehicle and in proximity to the illuminated symbol.

13. The illuminated symbol of claim 7, wherein the LED is not visible directly by an observer observing the illuminated symbol when mounted.

* * * * *